US012762100B2

(12) United States Patent
Eskandani et al.

(10) Patent No.: US 12,762,100 B2
(45) Date of Patent: Oct. 13, 2026

(54) COMPUTER-IMPLEMENTED METHOD FOR PROVIDING A DATA CONSISTENCY BETWEEN A FIRST DATA SOURCE AND AT LEAST A SECOND DATA SOURCE IN A DATA ENGINEERING SYSTEM

(71) Applicant: ABB Schweiz AG, Baden (CH)

(72) Inventors: Nafise Eskandani, Rossdorf (DE); Sten Gruener, Laudenbach (DE); Mario Hoernicke, Landau (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 19/172,952

(22) Filed: Apr. 8, 2025

(65) Prior Publication Data

US 2025/0315416 A1 Oct. 9, 2025

(30) Foreign Application Priority Data

Apr. 9, 2024 (EP) .................................... 24169278

(51) Int. Cl.
*G06F 7/00* (2006.01)
*G06F 16/215* (2019.01)
*G06F 16/23* (2019.01)

(52) U.S. Cl.
CPC ........ *G06F 16/215* (2019.01); *G06F 16/2329* (2019.01)

(58) Field of Classification Search
CPC .. G06F 16/214; G06F 16/215; G06F 16/2329; G06F 16/9577; G06F 16/953;
(Continued)

(56) References Cited

U.S. PATENT DOCUMENTS 8,996,458 B2 * 3/2015 Shang ................. G06F 11/2094 707/648
2004/0193952 A1 * 9/2004 Narayanan ............ G06F 16/273 714/13
(Continued)

FOREIGN PATENT DOCUMENTS

EP 3798768 A3 5/2021
WO WO 2024/040902 A1 2/2024

OTHER PUBLICATIONS

Li et al., "Inconsistent Data Cleaning Based on the Maximum Dependency Set and Attribute Correlation," *Symmetry*, 10(10): 24 pp. (Oct. 16, 2018).
(Continued)

*Primary Examiner* — Mohammad A Sana
(74) *Attorney, Agent, or Firm* — Fitch Even Tabin & Flannery LLP

(57) ABSTRACT

A method for providing data consistency between data sources includes providing first data, detecting a change information for the first data, providing a first version information of the detected change information, validating the change information, wherein a policy information contains at least a consistency rule executed on a common information model to decide about a consistent state of the first data defining whether the change information can be applied to the first data; updating the first version information to a second version information while confirming and repairing the detected data inconsistency of the change information, and supplying the change information with the version information as a production projection to at least a client engineering application.

8 Claims, 2 Drawing Sheets

(58) Field of Classification Search

CPC .. G06F 16/288; G06F 16/2237; G06F 16/285; G06F 16/9538; G06F 16/9038; G06F 16/338; G06F 16/9535; G06F 16/248; G06F 16/243; G06F 16/26; G06F 16/24522; G06F 16/3347; G06F 16/3344; G06F 16/332; G06F 16/3322; G06F 16/35; G06F 16/2456; G06F 16/2465; G06F 16/2471; G06F 16/24575; G06F 16/24578; G06F 16/2453; G06F 16/2457; G06F 11/2056; G06F 11/2058; G06F 11/2069; G06F 11/2066; G06F 11/2064; G06F 11/004; G06F 11/3006; G06F 11/3409; G06F 11/3419; G06F 11/2074; G06F 2201/855

See application file for complete search history.

(56) References Cited

U.S. PATENT DOCUMENTS

| | | | | |
|---|---|---|---|---|
| 2005/0149537 | A1 * | 7/2005 | Balin | G06F 16/214 |
| 2011/0153568 | A1 * | 6/2011 | Shang | G06F 11/2094<br>707/648 |

OTHER PUBLICATIONS

European Patent Office, Extended European Search Report in European Patent Application No. 24169278.9, 10 pp. (Oct. 2, 2024).

* cited by examiner

COMPUTER-IMPLEMENTED METHOD FOR PROVIDING A DATA CONSISTENCY BETWEEN A FIRST DATA SOURCE AND AT LEAST A SECOND DATA SOURCE IN A DATA ENGINEERING SYSTEM

CROSS-REFERENCE TO RELATED APPLICATIONS

The instant application claims priority to European Patent Application No. 24169278.9, filed Apr. 9, 2024, which is incorporated herein in its entirety by reference.

FIELD OF THE DISCLOSURE

The present invention relates to a computer-implemented method for providing a data consistency between a first data source and at least a second data source in a data engineering system.

BACKGROUND OF THE INVENTION

In a data engineering system such as an industrial system or a process in an industrial plant, engineering data that are processed in a defined process workflow can come from different sources due to a variety of reasons such as multidisciplinary nature of engineering, supply chain and partnerships, lifecycle phases involving multiple organizations, and regulations and standards. Each of these data contribute to a broader understanding of a system, process, or product. WO 2024040902 A1 refers to an example of distributed system to provide consistency of data coming from different sources.

However, effectively managing and integrating this data originating from various sources within a data engineering system or within an industrial process is a complex task. This requires consideration of multiple technical and non-technical aspects when handling these data streams within the data engineering system such as data quality, compatibility, privacy, and collaboration workflow among various participants.

Further, the process of integrating data originating from different data sources, tools and systems introduces significant technical complexities. When multiple stakeholders, whether individuals or groups, own segments of the integrated dataset, the potential for conflicts regarding data ownership, access rights, and usage permissions becomes apparent. The challenges intensify when dealing with longitudinal data, where changes in measurement procedures, development, or instrumentation can introduce inconsistencies across time points, in the sense of different "versions" of data. Sustaining accuracy and consistency for such data requires continuous monitoring, validation, and recalibration efforts which are error-prone, tedious, and expensive.

BRIEF SUMMARY OF THE INVENTION

The present disclosure generally describes an improved concept to enable consistent persistency of partially owned engineering data and facilitate version controlling of such data within a data engineering system in an efficient, secure, and automated manner.

In a first aspect of the present disclosure, there is provided a computer-implemented method for providing a data consistency between a first data source and at least a second data source in a data engineering system, comprising the following steps: Providing first data from at least a first data source and/or at least a second data source; Detecting, by an update detector component, a change information for the first data; Providing, by a version area component, a first version information of the detected change information; Validating, the change information for the first data, by a policy validator component, wherein a policy information containing at least a consistency rule is executed on a common information model to decide about a consistent state of the first data defining whether the change information can be applied to the first data; Updating, by the version controller component, the first version information to a second version information of the validated change information, when the consistent state of the change information is confirmed, and in case, the consistent state of the change information is not confirmed, perform a step of repairing the detected data inconsistency of the change information, before re-validating the change information and updating the first version information; and Supplying the change information with the version information as a production projection to at least a client engineering application.

In other words, an important aspect of the present disclosure is that data originating from different data sources are checked against a set of policies. Policies play a pivotal role in maintaining the consistency of data by establishing a set of unchanging guidelines or invariants that govern various properties. These properties are carefully tailored, e.g. based on needs of the particular application or project, to align with the specific needs and requirements, use cases, and preferences of an enterprise.

Guidelines or invariants are designed to ensure that the one party's preferences and changes are not conflicting with the enterprise's overall goals and requirements, while also accounting for factors such as security, compliance, and performance.

BRIEF DESCRIPTION OF THE SEVERAL VIEWS OF THE DRAWING(S)

DETAILED DESCRIPTION OF THE INVENTION

Figure 1:
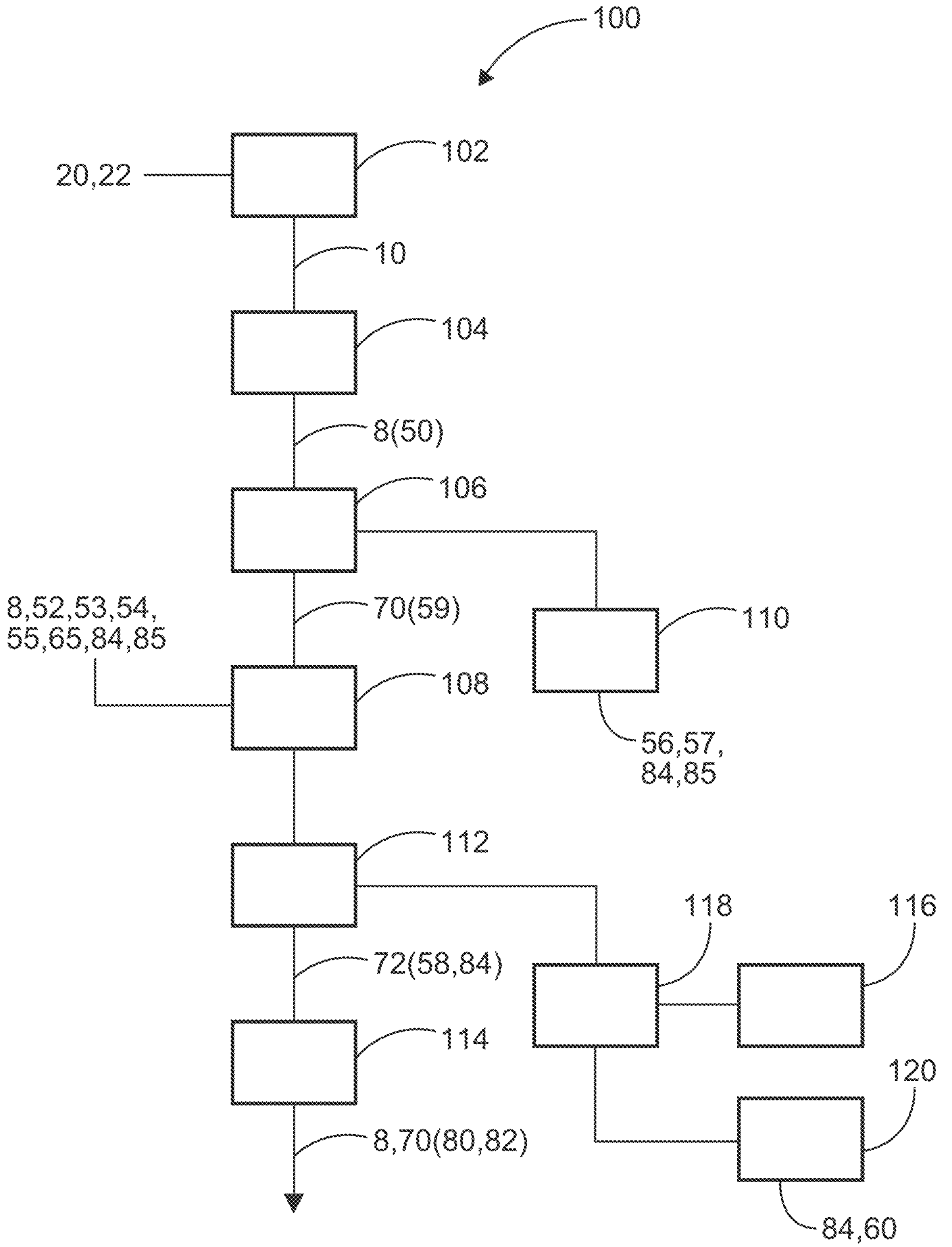
FIG. 1 is a schematic flow-diagram of a method in accordance with the present disclosure.

FIG. 1 (with references to FIG. 2 for further details of the involved technical components of the data engineering system 200 performing the method steps of the method 100) illustrates a schematic flow-diagram of a method 100 for providing a data consistency between a first data source 20 and at least a second data source 22 in a (distributed) data engineering system 200.

In a first step 102, first data or data 10 from at least a first data source 20 and/or at least a second data source 22 is provided. In a second step 104, a change information 8 for the first data 10, by an update detector component 50, is detected. In a third step 106, a first version information 70 of the detected change information 8 is provided by a version area component 59.

Optionally, the step 106 of validating the change information 8 includes a step of verifying 110 the change information 8, by a requirement refiner component 56, whether the change information 8 fulfils at least a predefined requirement criterion 57.

In a fourth step 108, the change information 8 for the first data 10 is validated, by a policy validator component 54, wherein a policy information 55 containing at least a consistency rule is executed on a common information model 52 to decide about a consistent state of the first data 10 defining whether the change information 8 can be applied to the first data 10.

The policy information 55 may be provided by a policy database 65. The policy database 65 may be connectable to at least a policy editor component 53 to edit the policy information 55 of the policy database 65 (see FIG. 2).

In a fifth step 112, updating is performed, by the version controller component 58, of the first version information 70 to a second version information 72 of the validated change information 8, when the consistent state of the change information 8 is confirmed.

In case, the consistent state of the change information 8 is not confirmed, a step 118 of repairing the detected data inconsistency of the change information 8 is performed, before re-validating the change information 8 and updating the first version information 70. The repair of the detected data inconsistency of the change information 8 of the first data 10 may be performed by a user-related client engineering application 82 (see FIG. 2).

It should be noted in this context, that the provided second version information 72 is permanent in case the change information 8 of the first data 10 is in a consistent state, and the provided second version information 72 is temporary in case the change information 8 of the first data 10 is in an inconsistent state.

Optionally, the step 118 of repairing the detected data inconsistency of the change information 8 of the first data 10 comprises a step 116 of marking the detected data inconsistency and blocking to send the change information 8 to the production projection 80 as long as the detected data inconsistency of the change information 8 exists.

Optionally, the step 118 of repairing the detected data inconsistency of the change information 8 comprises the step 120 of temporarily projecting the detected data inconsistency, by a client versioning and management interface 84, to a staging component 60 that initiates repair of the detected data inconsistency of the change information 8 of the first data 10.

Optionally, after the step 118 of repairing the detected data inconsistency of the change information 8 is successfully performed, the repaired changed information 8 is sent back from the staging component 60 to the version controller component 58 for performing the step 108 of re-validating the repaired change information 8 of the first data 10.

After successful re-validating of the change information 8 of the first data 10, the change information 8 is provided to the second data source 22. Optionally, the change information 8 is a newly-added data information contained in the first data source 20, but not in the second data source 22.

In a sixth step 114, the change information 8 with the version information 70 as a production projection 80 is supplied to at least a client engineering application 82. Optionally, according to FIG. 1 and FIG. 2, a client versioning and management component 84 is provided that has interfaces to each of at least one of the version controller component 58, the requirement refiner component 56 and the policy editor 53 to provide user-related client versioning information 85 to any of these components.

Figure 2:
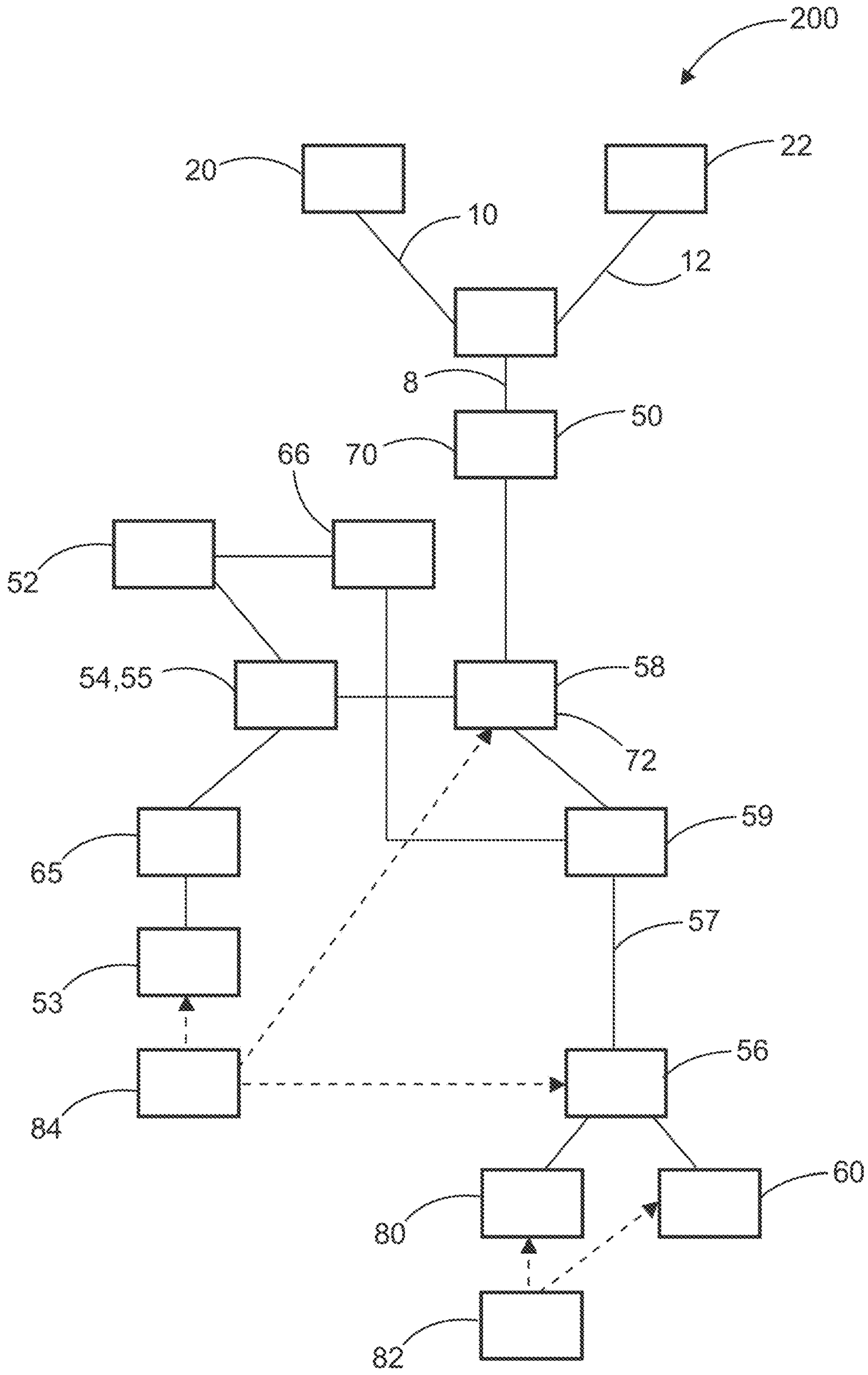
FIG. 2 is a diagram of a data engineering system for providing a data consistency between a first data source and a second data source according to an embodiment of the present disclosure.

FIG. 2 illustrates a data engineering system 200 for providing a data consistency between a first data source 20 and a second data source 22 according to an embodiment of the present invention by executing the method 100 according to the present invention.

In order to avoid repetitions, a concrete example data flow of the method 100 with the involved components of the (distributed) data engineering system 200 focusing on important aspects of the present invention is described in the following referring to FIG. 2:

1. There are two data sources 20, 22, such as tag list and P&ID available as source 20 and source 22, respectively. A consistency policy ensures that each tag name in the P&ID is present in the tag list.
2. The mapping is created within the common information model 52, however only for "Tag A" and "Tag B" which are consistent.
3. Now an update in the tag list is detected—"Tag C" is added to the tag list, but not to the P&ID.
4. Update detector/Version controller component 58 detects the changes and versions it in the versioning area 59.
5. Updates are passed through the content mapper 66 and the exact common information model is created.
6. Policy validation component 54 tries to execute the consistency rules on the common information model 52, and an inconsistency is detected "Tag C missing in the P&ID".
7. The inconsistency is marked, and the push to the production projection 80 is blocked.
8. By using the client versioning and management interface 84, the inconsistent vision can temporarily be projected to the staging area 60, where native tools can be used to repair the data inconsistency.
9. Once repaired manually, e.g., added a Tag C to the Excel document, the change from the native client can be pushed back to the staging component 60 and then back to the versioning area component 59.
10. Once re-validation of the change information 8 of the first data 10 is successful, the following steps are performed:
    a. Push to the client engineering application 82.
    b. A corrective up-stream push to source 22 is done which may be detected by the client.

Using (user-)defined rules, policies and policy management platforms in the present invention for assessing consistency of data from different sources allow to specify which data owner has a higher priority to be the source of truth in the case of simultaneous updates. For example, a data retention policy could specify that customer transaction records must be stored for a minimum of seven years. This policy establishes an unchanging guideline that shapes the behavior of the system's data management processes.

Once the to-be assessed data in the data engineering system is validated, the data is tagged, e.g. by timestamp, to create new versions of this data that can be used within the data engineering system without the danger of potential data conflicts with other data. The present invention, validated and versioned data are then stored for example in a global registry of the data engineering system by using these rules and policy management platforms.

Further, these policies can by automatically adapted upon changes of requirements that specify the high-level directives into concrete technical specifications. Considering these specifications, database schemas can be generated, and different versions of data can be populated into the database. An aspect to achieve these advantages is to store valid and versioned data in a global registry of the data engineering system by using of rules and policy management platforms.

The present invention provides the advantage to reduce the costs of data managing and handling of data versioning of such data coming from different data sources. Further, the reliability of the integrated data is improved and automatically versioning and managing conflicts of partially owned data is enabled in an efficient manner.

A further advantageous aspect of the present invention is the use of a graph-based database to facilitate search in the database and visualize relationships between entities of complex engineering data and queries.

According to an example, the step of validating the change information includes the step of verifying the change information, by a requirement refiner component, whether the change information fulfils at least a predefined requirement criterion. In this way, an efficient data validating is ensured.

According to an example, the step of repairing the detected data inconsistency of the change information of the first data comprises a step of marking the detected data inconsistency and blocking to send the change information to the production projection as long as the detected data inconsistency of the change information exists. In this way, it is avoided that data inconsistencies and data conflicts are provided to the production projection influencing its functionality.

According to an example, the step of repairing the detected data inconsistency of the change information comprises the step of temporarily projecting the detected data inconsistency, by a client versioning and management interface, to a staging component that initiates repair of the detected data inconsistency of the change information of the first data. In this way, the detected data inconsistency can be efficient resolved.

According to an example, wherein after the step of repairing the detected data inconsistency of the change information is successfully performed, the repaired changed information is sent back from the staging component to the version controller component for performing the step of re-validating the repaired change information of the first data. In this manner, data validating of the repaired change information of the first data is ensured.

According to an example, after successful re-validating of the change information of the first data, providing the change information to the second data source. In this way, it is ensured that only validated data are transferred and used which avoids potential data conflicts with the data engineering system.

According to an example, the repair of the detected data inconsistency of the change information of the first data is performed by a user-related client engineering application. In this way, efficient and user-oriented repair of data inconsistencies of change information of the first data can be ensured.

According to an example, the provided second version information is permanent in case the change information of the first data is in a consistent state, and the provided second version information is temporary in case the change information of the first data is in an inconsistent state. In this way, change information of the first data is handled in an efficient manner on basis of different application scenarios.

According to an example, the policy information is provided by a policy database. In this way, the policy information can be efficiently provided and updated depending on different or changing application scenarios.

According to an example, the policy database is connectable to at least a policy editor component to edit the policy information of the policy database. In this manner, policy information can be updated in an efficient manner when an application scenario of the data engineering system is changing.

According to an example, a client versioning and management component is provided that has interfaces to each of at least one of the version controller component, the requirement refiner component and the policy editor to provide user-related client versioning information to any of these components. In this way, flexibility of the data versioning of the first data is ensured.

According to an example, the change information is a newly-added data information contained in the first data source, but not in the second data source. In this way, a dedicated data sharing to different data sources is enabled.

In a second aspect of the present disclosure, a data engineering system that is configured to execute the method according to any of the previous examples and/or according to the first aspect for providing a data consistency between a first data source and at least a second data source in this data engineering system is provided.

In a third aspect of the present disclosure, a computer system that is configured to execute the computer-implemented method according to any of the previous examples and/or according to the first aspect for providing a data consistency of a distributed data engineering system is provided.

In a fourth aspect of the present disclosure, a computer comprising a processor configured to perform the method according to the first aspect and/or according to any of the previous examples is provided.

In a fifth aspect of the present disclosure, a computer program product comprising instructions which, when the computer program is executed by a processor of a computer, causes the computer to perform the method of the first aspect and/or of any of the previous examples.

In a sixth aspect of the present disclosure, a machine-readable data medium and/or download product is provided containing the computer program according to the fifth aspect.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE SIGNS

8 Change information
10 First data
12 Second data
20 First data source
22 Second data source
50 Update detector component
52 Common information model
53 Policy editor
54 Policy validator component
55 Policy information
56 Requirement refiner component
57 Predefined requirement criterion
58 Version controller component
59 Versioning area component
60 Staging component
65 Policy database
70 First version information
72 Second version information
80 Production projection
82 User-related client engineering application
84 Client versioning and management interface
85 User-related client versioning information
100 Computer-implemented method
102 Providing
104 Detecting
106 Providing
108 Validating
110 Verifying
112 Updating
114 Supplying
116 Marking
118 Repairing
120 Projecting
200 Data engineering system

What is claimed is:

1. A computer-implemented method for providing a data consistency between a first data source and at least a second data source in a data engineering system, comprising:

providing first data from at least a first data source and at least a second data source;

detecting by an update detector component a change information for the first data;

providing by a version area component a first version information of the detected change information;

validating the change information for the first data by a policy validator component, wherein a policy information containing at least a consistency rule is executed on a common information model to decide about a consistent state of the first data defining whether the change information can be applied to the first data;

updating by the version controller component the first version information to a second version information of the validated change information, when the consistent state of the change information is confirmed, and in case, the consistent state of the change information is not confirmed, perform a step of repairing the detected data inconsistency of the change information, before re-validating the change information and updating the first version information;

supplying the change information with the version information as a production projection to at least a client engineering application;

wherein repairing the detected data inconsistency of the change information of the first data comprises marking the detected data inconsistency and blocking to send the change information to the production projection as long as the detected data inconsistency of the change information exists;

wherein the step of repairing the detected data inconsistency of the change information comprises temporarily projecting the detected data inconsistency, by a client versioning and management interface, to a staging component that initiates repair of the detected data inconsistency of the change information of the first data;

wherein after repairing the detected data inconsistency of the change information is successfully performed, the repaired changed information is returned from the staging component to the version controller component for re-validating the repaired change information of the first data;

wherein the change information is provided to the second data source after successful re-validating of the change information of the first data;

wherein repair of the detected data inconsistency of the change information of the first data is performed by a user-related client engineering application.

2. The computer-implemented method of claim 1, wherein validating the change information includes verifying the change information by a requirement refiner component, which determines whether the change information fulfils at least a predefined requirement criterion.

3. The computer-implemented method of claim 1, wherein the provided second version information is permanent in case the change information of the first data is in a consistent state, and the provided second version information is temporary in case the change information of the first data is in an inconsistent state.

4. The computer-implemented method of claim 1, wherein the policy information is provided by a policy database.

5. The computer-implemented method of claim 4, wherein the policy database is connectable to at least a policy editor component to edit the policy information of the policy database.

6. The computer-implemented method of claim 1, wherein a client versioning and management component is provided that has interfaces to each of at least one of the version controller component, the requirement refiner component, and the policy editor, to provide user-related client versioning information to at least one of the version controller component, the requirement refiner component, and the policy editor.

7. The computer-implemented method of claim 1, wherein the change information is a newly-added data information contained in the first data source but not contained in the second data source.

8. A computer program product comprising instructions stored in tangible media which, when the computer program is executed by a processor of a computer, causes the computer to perform a computer-implemented method for providing a data consistency between a first data source and at least a second data source in a data engineering system, comprising:

providing first data from at least a first data source and at least a second data source;

detecting by an update detector component a change information for the first data;

providing by a version area component a first version information of the detected change information;

validating the change information for the first data by a policy validator component, wherein a policy information containing at least a consistency rule is executed on a common information model to decide about a consistent state of the first data defining whether the change information can be applied to the first data;

updating by the version controller component the first version information to a second version information of the validated change information, when the consistent state of the change information is confirmed, and in case, the consistent state of the change information is not confirmed, perform a step of repairing the detected data inconsistency of the change information, before re-validating the change information and updating the first version information;

supplying the change information with the version information as a production projection to at least a client engineering application;

wherein repairing the detected data inconsistency of the change information of the first data comprises marking the detected data inconsistency and blocking to send the change information to the production projection as long as the detected data inconsistency of the change information exists;

wherein the step of repairing the detected data inconsistency of the change information comprises temporarily projecting the detected data inconsistency, by a client versioning and management interface, to a staging component that initiates repair of the detected data inconsistency of the change information of the first data;

wherein after repairing the detected data inconsistency of the change information is successfully performed, the repaired changed information is returned from the staging component to the version controller component for re-validating the repaired change information of the first data;

wherein the change information is provided to the second data source after successful re-validating of the change information of the first data;

wherein repair of the detected data inconsistency of the change information of the first data is performed by a user-related client engineering application.

* * * * *